(12) United States Patent
Moliner

(10) Patent No.: US 9,016,715 B2
(45) Date of Patent: Apr. 28, 2015

(54) MOBILITY DEVICE

(75) Inventor: Michael Moliner, Eastman (CA)

(73) Assignee: Rideup Mobility Inc., Quebec (CA)

( * ) Notice: Subject to any disclaimer, the term of this patent is extended or adjusted under 35 U.S.C. 154(b) by 11 days.

(21) Appl. No.: 13/700,301

(22) PCT Filed: May 30, 2011

(86) PCT No.: PCT/CA2011/000611
§ 371 (c)(1),
(2), (4) Date: Nov. 27, 2012

(87) PCT Pub. No.: WO2011/147023
PCT Pub. Date: Dec. 1, 2011

(65) Prior Publication Data
US 2013/0069344 A1    Mar. 21, 2013

Related U.S. Application Data

(60) Provisional application No. 61/349,416, filed on May 28, 2010.

(51) Int. Cl.
| | |
|---|---|
| *B62B 7/06* | (2006.01) |
| *A61G 5/08* | (2006.01) |
| *B60N 2/02* | (2006.01) |
| *A61G 5/04* | (2013.01) |
| *A61G 5/10* | (2006.01) |
| *A61G 5/14* | (2006.01) |
| *A61G 5/12* | (2006.01) |

(52) U.S. Cl.
CPC *B60N 2/02* (2013.01); *A61G 5/042* (2013.01); *A61G 5/1059* (2013.01); *A61G 5/107* (2013.01); *A61G 5/14* (2013.01); *A61G 2005/085* (2013.01); *A61G 2005/125* (2013.01); *A61G 2005/127* (2013.01); *A61G 2005/128* (2013.01); *Y10S 180/907* (2013.01)

(58) Field of Classification Search
CPC ............. B62B 7/06; B62B 7/12; A61G 5/04; A61G 5/08; A61G 5/10; A61G 5/14; A61G 2005/08; A61G 2005/0808; A61G 3/02; A61H 3/04
USPC ........... 280/304.1, 250.1, 642, 643, 647, 648, 280/650, 657, 658; 180/907; 297/DIG. 4
See application file for complete search history.

(56) References Cited

U.S. PATENT DOCUMENTS

| | | | | |
|---|---|---|---|---|
| 4,456,086 | A * | 6/1984 | Wier et al. | 180/11 |
| 4,506,930 | A * | 3/1985 | Lambert | 297/423.11 |
| 4,704,749 | A * | 11/1987 | Aubert | 5/87.1 |
| 5,476,432 | A * | 12/1995 | Dickens | 482/67 |
| 6,440,046 | B1 * | 8/2002 | Tholkes | 482/142 |
| 7,921,953 | B2 * | 4/2011 | Irvine | 180/208 |
| 8,584,689 | B2 * | 11/2013 | Catton | 135/67 |

* cited by examiner

*Primary Examiner* — Frank Vanaman
(74) *Attorney, Agent, or Firm* — Robert Brouillette; Brouillette & Partners

(57) ABSTRACT

A mobility device for people who need assisted mobility comprising side support structures for supporting the weight of an occupant in a semi seated position, a back rest structure, a shin rest structure and an arm rest structure. The mobility device of the present invention provides a rear access which is feasible by moving outwardly and upwardly the side support structures.

21 Claims, 23 Drawing Sheets

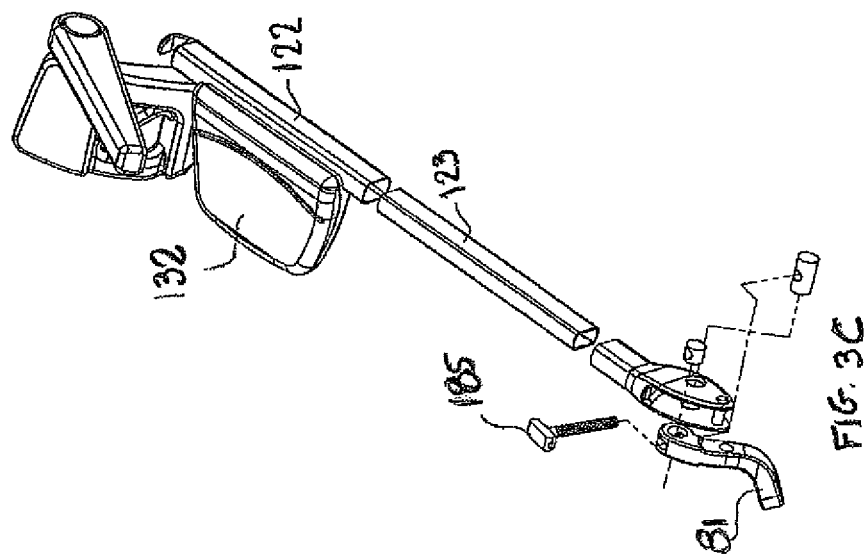
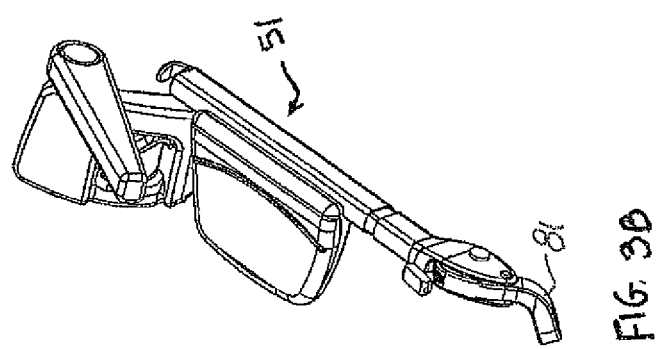

MOBILITY DEVICE

CROSS-REFERENCE TO RELATED APPLICATIONS

The present patent application claims the benefits of priority of commonly assigned U.S. Provisional Patent Application No. 61/349,416, entitled "Motorized Personal Mobility Carrier", and filed at the United States Patent and Trademark Office on May 28, 2010.

FIELD OF THE INVENTION

The present invention generally relates to personal carrying vehicle.

BACKGROUND OF THE INVENTION

The use of wheelchairs including both powered and manually driven wheelchairs has been well known for a great number of years. Wheelchairs have been used to effect the transport of the injured, sick, aged or some combination thereof. Typically, known manually operated wheelchairs include two large rear wheels which can be grasped by an occupant and rotated to advance the chair. Known powered wheelchairs include a fairly complex drive system for driving the wheels of the wheelchair in response to operation of a set of hand controls or the like. Known powered wheelchairs are substantially more costly than manually operated wheelchairs.

One problem associated with current wheelchairs is that the height cannot be adjusted by the occupant, for comfort or for a particular activity. For example, it will be difficult for an occupant in a wheelchair to work on a counter. Another problem for people having different levels of mobility problem is to seat in a wheelchair.

Accordingly, a continuing need exists in the art for a mobility device providing an easy access and which is adjustable for a particular occupant or for a particular activity.

SUMMARY OF THE INVENTION

The present invention is generally providing a personal mobility device comprising a wheeled base comprising a base platform; side support structure extending above the wheeled base, the side support structure comprising a left side support structure and a right side support structure having a lower extremity, wherein the side support structure has an access configuration and a seat configuration, the side support structure comprising: seat support members; a seat structure connected to the seat support members; a back rest structure connected to the seat support members; an arm rest structure connected to the seat support members; and the mobility device also comprising a shin rest structure extending above the wheeled base; and a pivoting mechanism connected at the lower extremity of the left side support structure and at the lower extremity of the right side support structure allowing the left side support structure and the right side support structure to pivot outwardly and upwardly to provide a rear access to the mobility device.

The present invention is also providing a personal mobility device comprising a wheeled base comprising a base platform; a left seat support member extending from a first left pivot member and a right seat support member extending from a first right pivot member; a left seat structure connected to the left seat support member and a right seat structure connected to the right seat support member; a left back rest structure connected to the left seat support member and a right back rest structure connected to the right seat support member; a shin rest structure extending above the wheeled base; and a left arm rest structure connected to the left seat support member and a right arm rest structure connected to the right seat support member, wherein the first pivot member pivot along a pivoting axis leaning outwardly and rearwardly from the mobility device, causing the left seat support member and right seat support member to pivot outwardly to provide a rear access to the mobility device, and wherein the mobility device has an access configuration and a seat configuration.

In a further preferred embodiment, the mobility device comprises a lateral pivoting mechanism connected at the lower extremity of the left side support structure and at the lower extremity of the right side support structure allowing the left side support structure and the right side support structure to pivot outwardly; and a lateral pivoting mechanism connected at the lower extremity of the left side support structure and at the lower extremity of the right side support structure allowing the left side support structure and the right side support structure to pivot upwardly.

The mobility device of the present invention is a device for an able body person, temporary disabled people or individuals that are experiencing need for a mobility aid. Multiple features make it more usable than a regular wheelchair or mobility device and give the occupant a chance to stay mobile for longer periods of time. The small size of the wheeled base gives the mobility device access to smaller areas, which is more difficult with conventional scooters or wheelchairs. The mobility device gives more independence with an active body posture for the occupant. The general geometry of the mobility device gives the occupant a dynamic position for a more reactive and interactive ride.

An important feature of the mobility device is the rear access to seating position. Rear access to the mobility device is made possible by opening outwardly and upwardly the side support structure, providing an access to the occupant. In preferred embodiment, both left and right side support structure pivot outwardly and upwardly simultaneously, i.e. at the same time. In another preferred embodiment, both left and right side support structure pivot outwardly and upwardly successively, this is achieved by providing a vertical pivoting mechanism and a lateral pivoting mechanism. The right and left side support structure, or lateral support structure, pivot outwardly, leaving the rear clear for an occupant to step onto the wheeled base and then to seat on the seat structure. The rear access enables the mobility device to be positioned adjacent to a bed so that the occupant does not need to turn 180 degrees before being seated. Also, the mobility device provides clearance to the toilet without the occupant needing to spin 180 degree. It is to be understood that the side support structure could also open only laterally along a vertical axis.

In a preferred embodiment, the pivoting mechanism is located in front of the occupant leg's. However, it is still possible to have a pivoting mechanism that is not in front of the legs of the occupant.

One of the goals of the present invention is to provide a lightweight, affordable, and compact mobility device that enables occupants to transport themselves. The mobility device can be used to move around all types of urban living environments. The mobility device is collapsible for convenient storage or transportation.

The mobility device of the present invention enables the occupant to transport and maneuver themselves to the wide variety of domestic and urban environments that can be faced on a daily basis, all the while maintaining a comfortable dynamic sitting position.

The mobility device is adjustable to fit occupants of varying size. The forward leaning seat structure can be raised or lowered and the seat structure can be moved rearward or forward along the seat support member.

Locking motorized wheels prevent movement of the mobility device during mounting and dismounting, i.e. when the side support structure is in an opened configuration.

The position of an occupant in the mobility device is active or dynamic in the sense that the legs, the abdomen and back muscles are being used, unlike a conventional wheelchair where there is a static strain on the muscles that lead to discomfort. The dynamic position maintains the blood circulation and reduces the long-term fatigues. The present mobility device makes it easier for an occupant to sit with a balanced upper torso that maintains the natural curve of the back without a complete back support.

The side or lateral support structure, on which is connected the seat structure, the back rest structure and the arm rest structure, can be opened outwardly by pivoting them. The side support structure can also be raised or lowered to adjust the mobility device configuration to an occupant.

The back rest structure and the arm rest structure are provided at or adjacent to the upper end of the side support structure.

The seat support structure is connected to the side support structure and the position of the seat structure is adjustable on the side support structure so it can be adjusted to suit an occupant.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 3b is a close-up view of the left side support structure of the mobility device shown in FIG. 1.

FIG. 3c is an exploded view of the left side support structure shown in FIG. 3c.

DETAILED DESCRIPTION OF THE PREFERRED EMBODIMENT

A novel mobility device will be described hereinafter. Although the invention is described in terms of specific illustrative embodiments, it is to be understood that the embodiments described herein are by way of example only and that the scope of the invention is not intended to be limited thereby.

Figure 1:
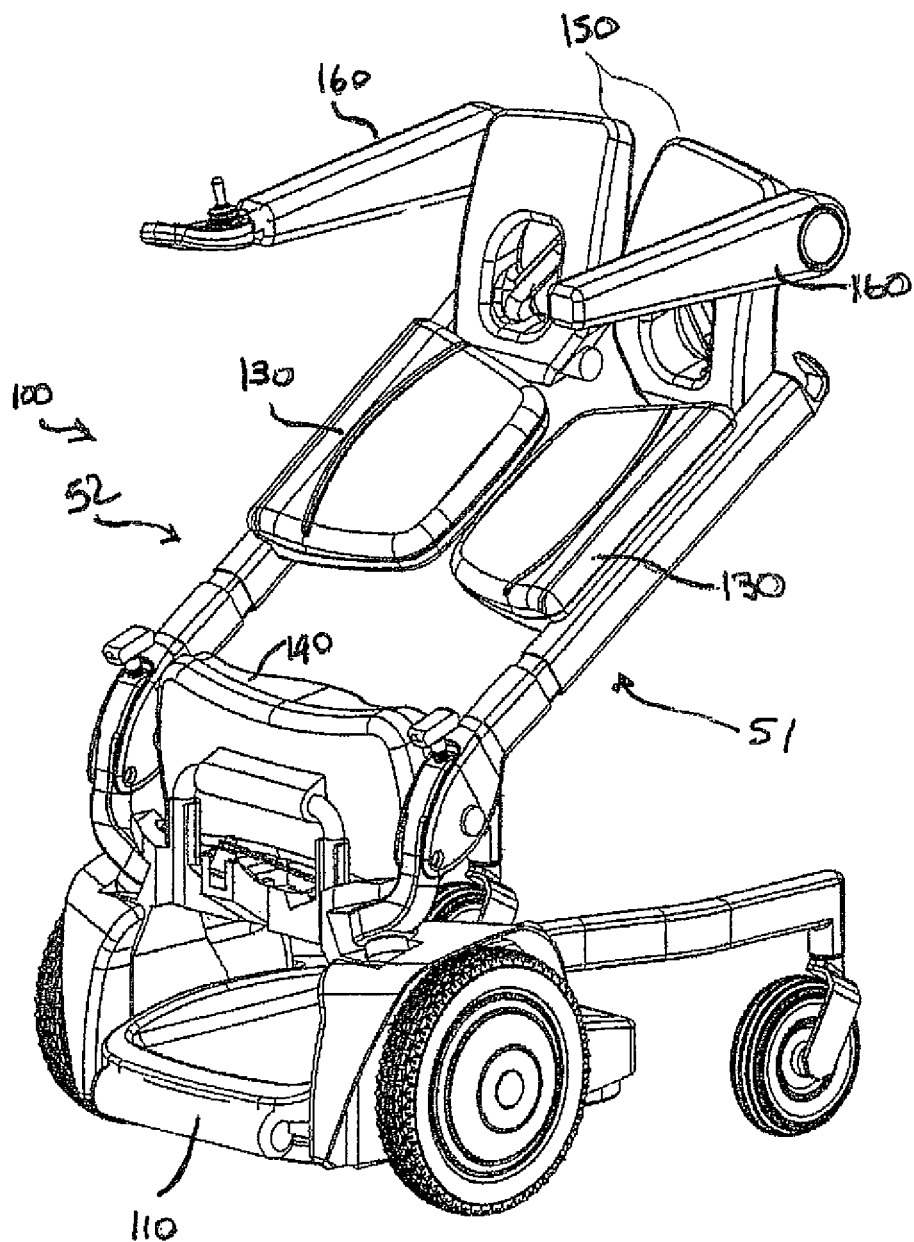
FIG. 1 is a perspective view of first embodiment of a mobility device according to the present invention.
Figure 2:
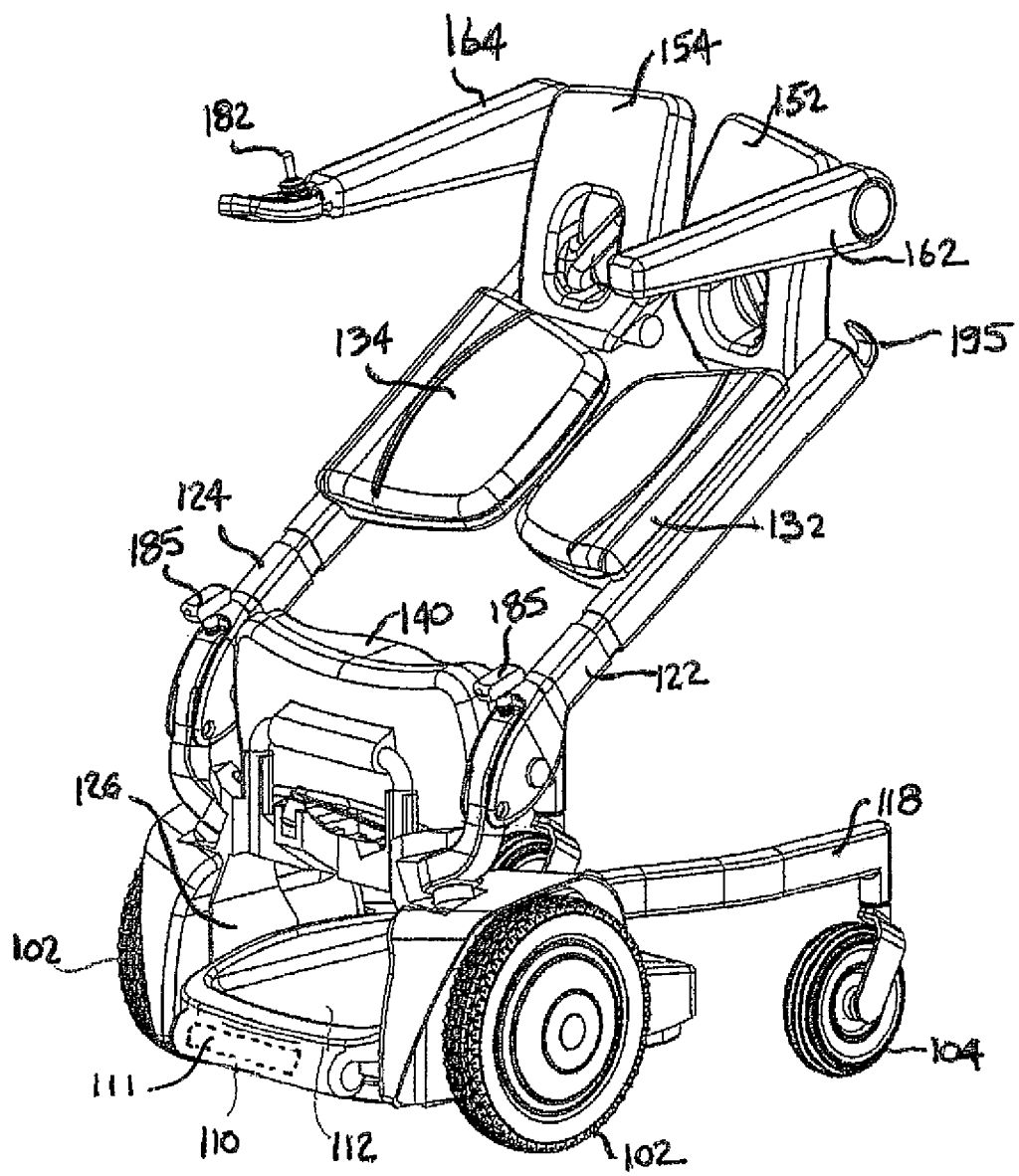
FIG. 2 is another perspective view of first embodiment of a mobility device according to the present invention.

As illustrated in FIGS. 1 and 2, the mobility device 100 generally comprises a wheeled base 110, a seat structure 130, a shin rest structure 140, a back rest structure 150 and an arm rest structure 160.

The mobility device generally comprises a left side support structure 51 and a right side support structure 52 that may be opened outwardly to provide a rear access to the mobility device, allowing an occupant to sit down on the mobility device, as it will be explained hereafter, and to exit the mobility device easily. The height and general configuration of the mobility device can be adjusted for each occupant, for comfort or for a particular activity. The mobility device can adopt an access configuration, i.e. the side support structures are outwardly pivoted, to provide a rear access to the mobility device. It is important that the side support structure open outwardly to provide enough space for almost any occupant to enter between these side support structures, regardless of the size of the hips. The mobility device can also adopt a seat configuration, i.e. the support structures are disposed so that an occupant can seat on the mobility device.

Wheeled Base

Now referring more particularly to FIG. 2, the mobility device comprises the wheeled base 110 within which the power supply, primary electronics and motors are preferably mounted 111. On both sides of the wheeled base 110 are the drive wheels 102 and the rear wheels 104. The drive wheels 102 may have integrated motors to propel the mobility device or can be driven by the motors integrated in the wheeled base 110. Rear wheels 104 are connected at the rear of the wheeled base 110, on the base members 118. The wheeled base 110 comprises a base platform 112 on which an occupant step up prior to seat in the mobility device 100. Front support members 126 extend substantially vertically from the wheeled base 110.

The position of the drive wheels 102, being forward of the sitting position, creates a very stable set-up for uneven terrain, up and down hills and climbs forward over small obstacles. Most of the mobility device pivot points are in front of the occupant's center of gravity. However, rear propulsion could also be used with the mobility device.

Seat Structure

The seat structure 130 comprises a left side seat portion 132 and a right side seat portion 134. The seat structures 132 and 134 are respectively connected to the left seat support member 122 and the right seat support member 124 that extend near or at the upper end of the front support members 126.

Figure 3A:
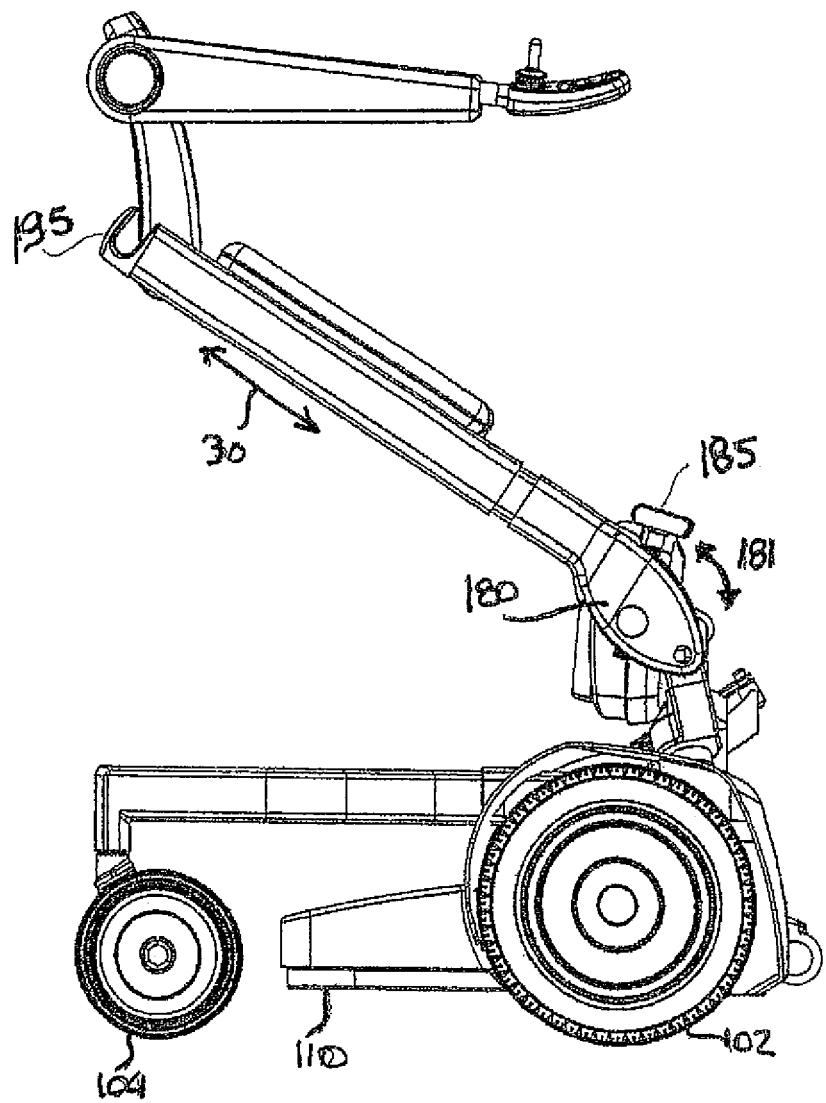
FIG. 3a is a side view of the mobility device shown in FIG. 1.
Figure 4:
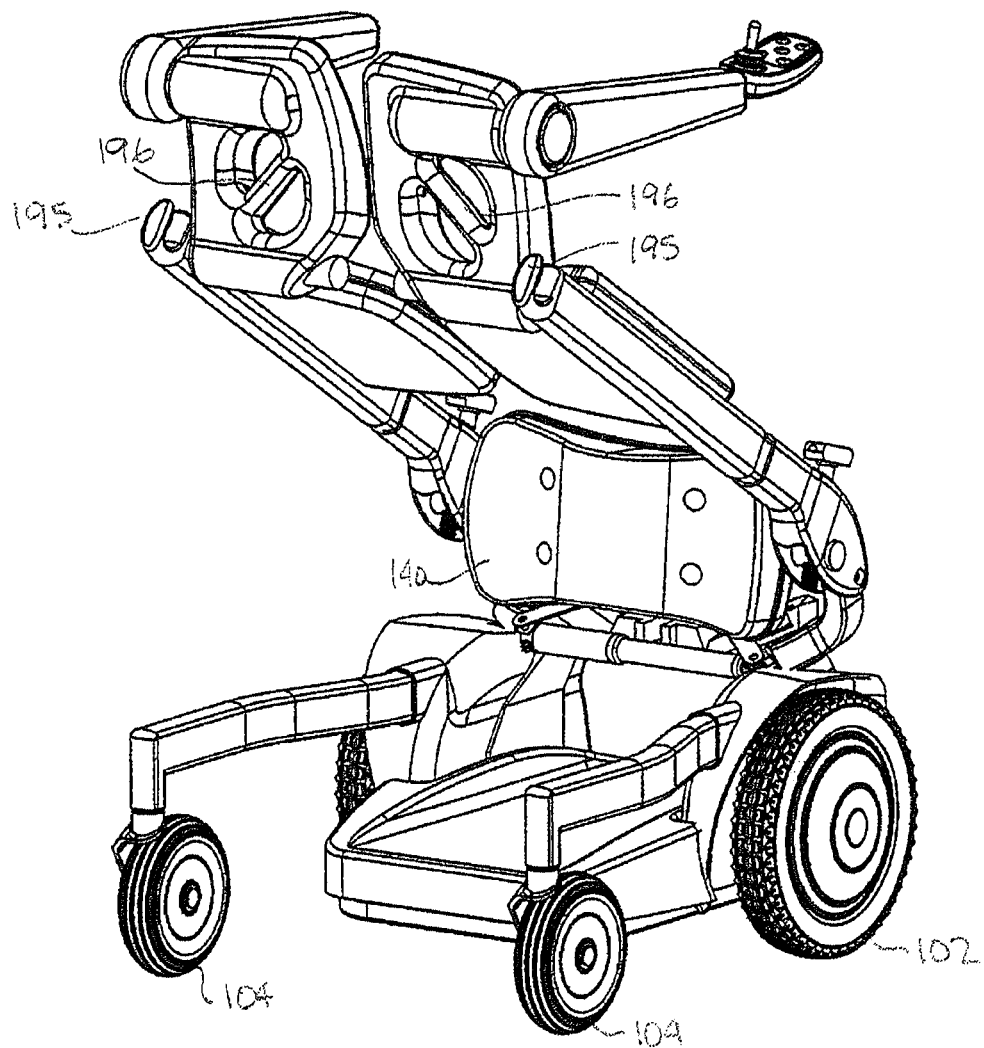
FIG. 4 is a rear view of the mobility device shown in FIG. 1.
Figure 5A:
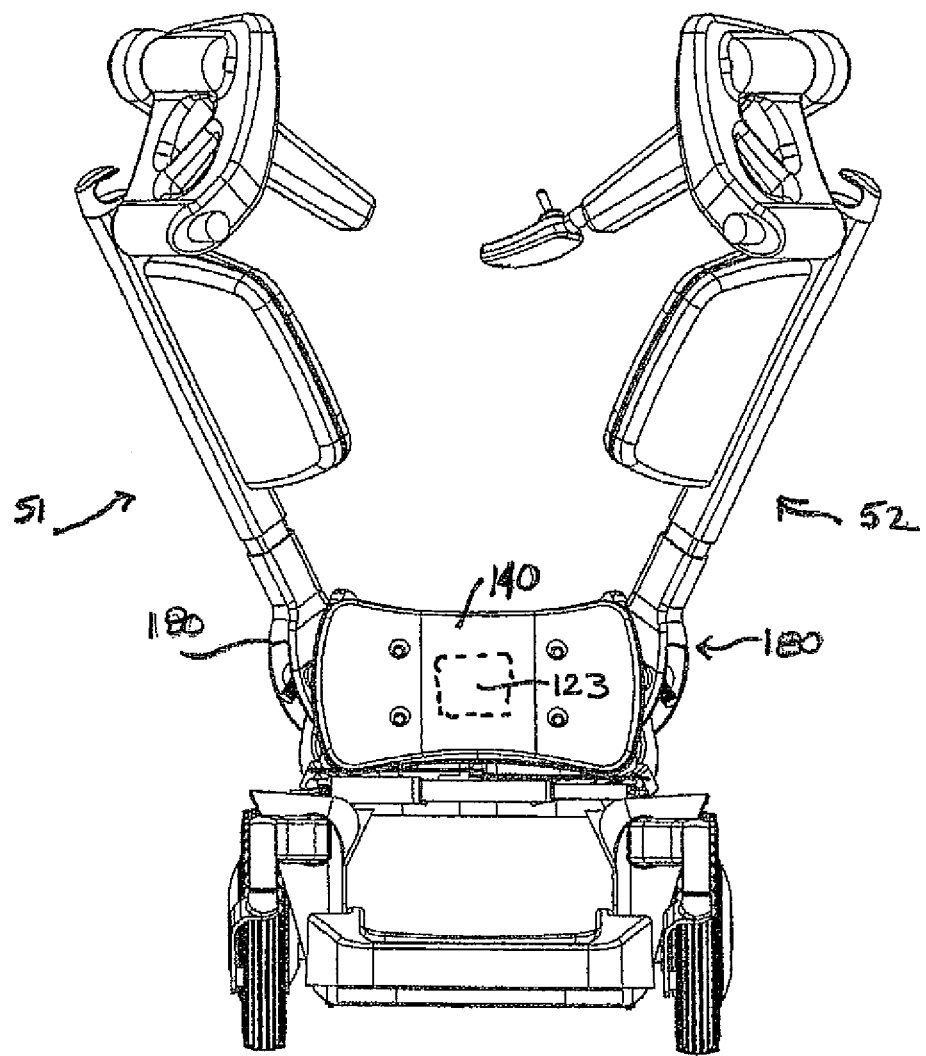
FIG. 5a is a rear view of the mobility device shown in FIG. 1.
Figure 5B:
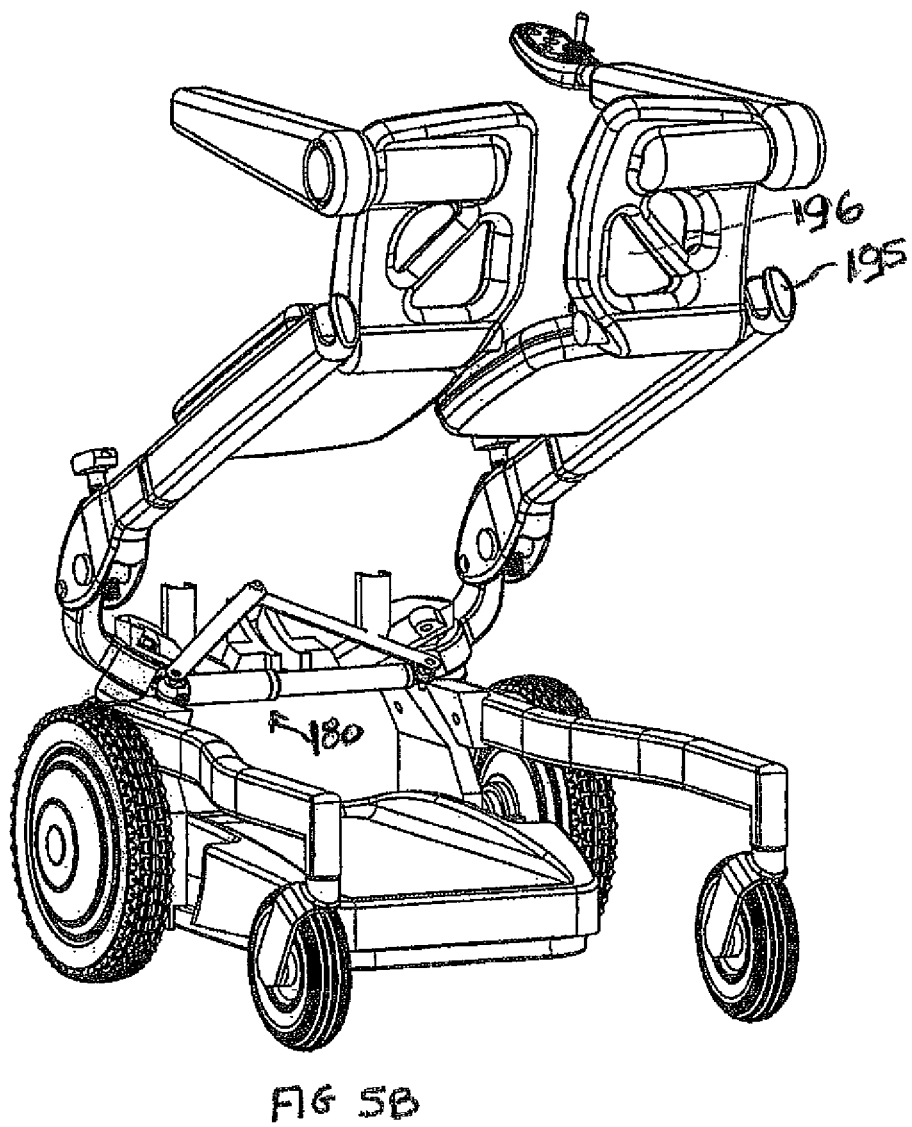
FIG. 5b is rear view of the mobility device shown in FIG. 1, showing more particularly the pivoting mechanism.
Figure 5C:
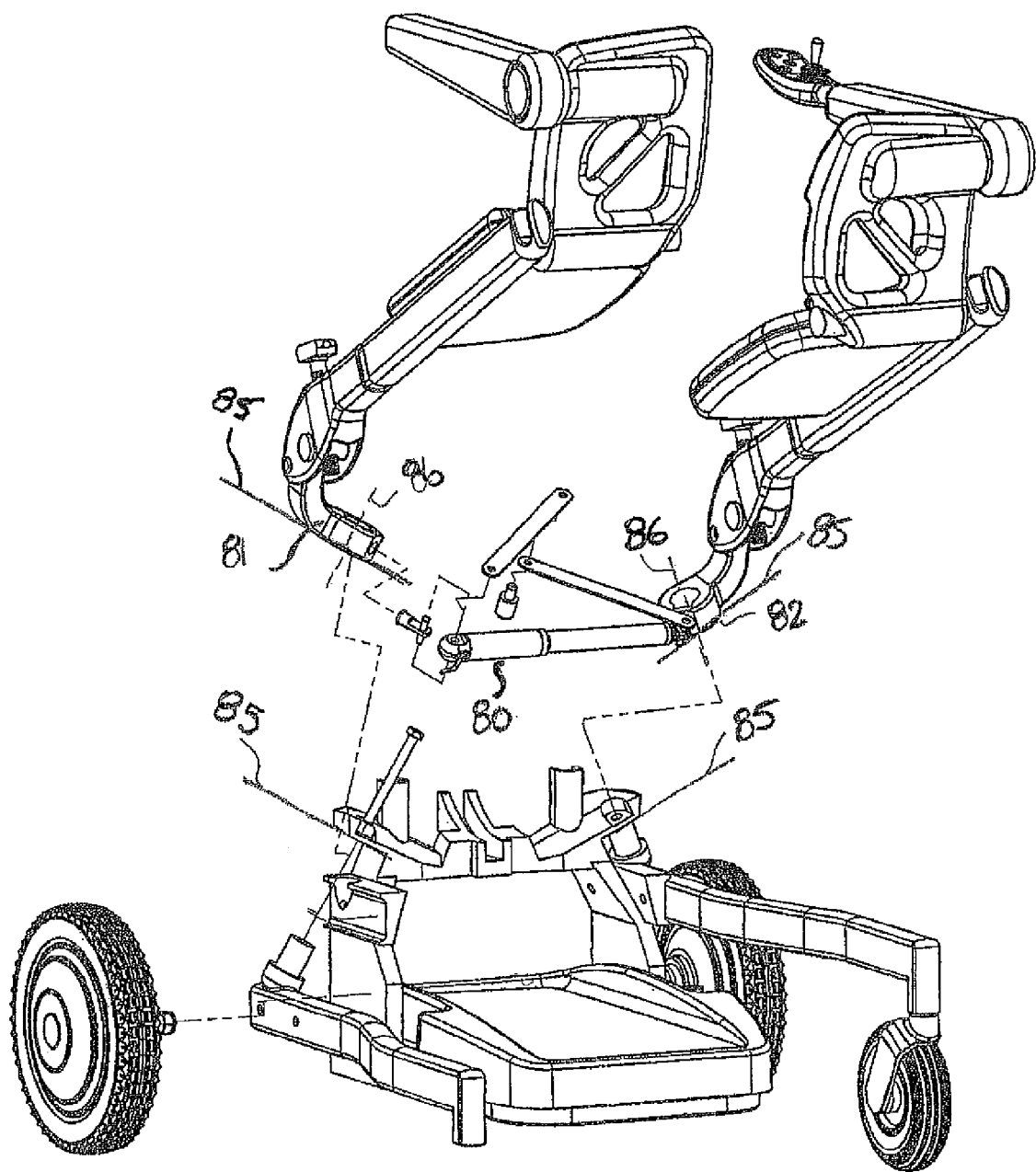
FIG. 5c is a partially exploded view of the mobility device shown in FIG. 5b.
Figure 6:
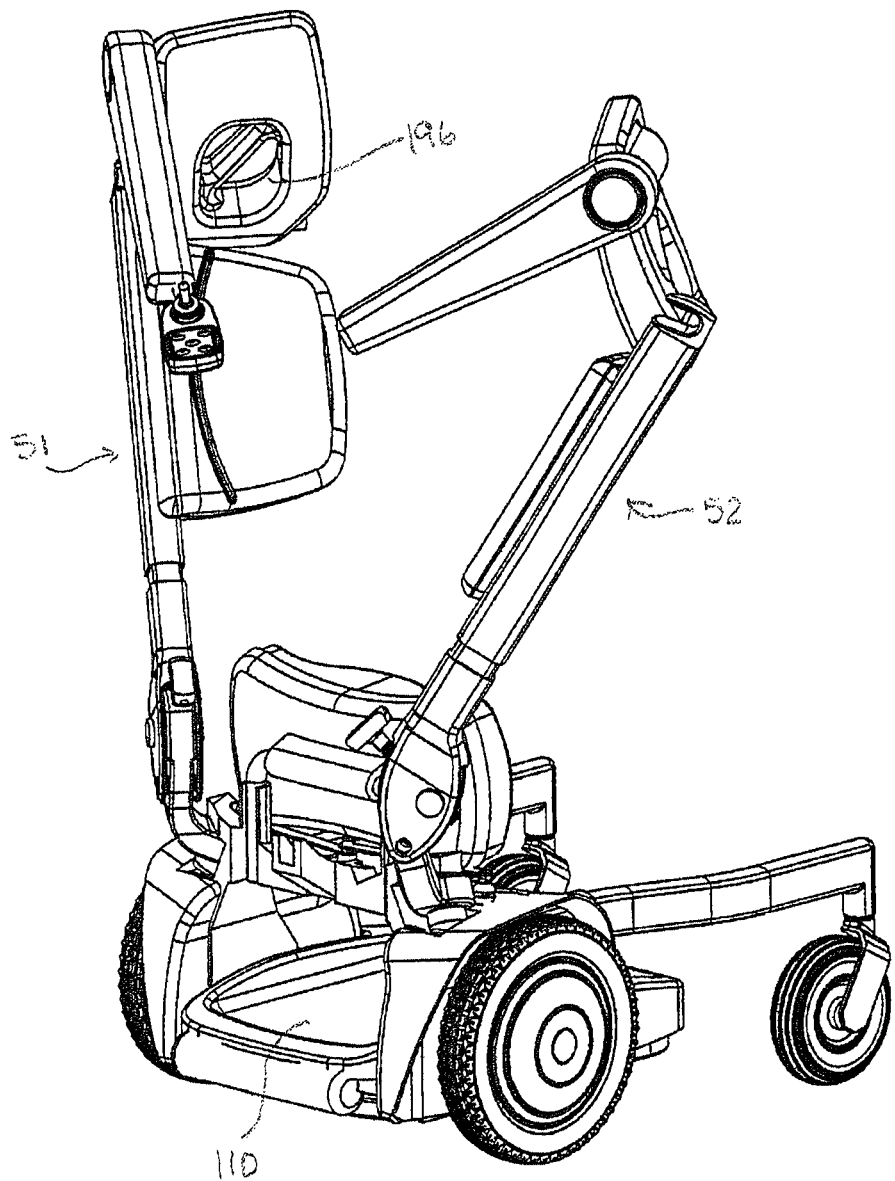
FIG. 6 is a front perspective view of the mobility device shown in FIG. 1, in an opened configuration.
Figure 7:
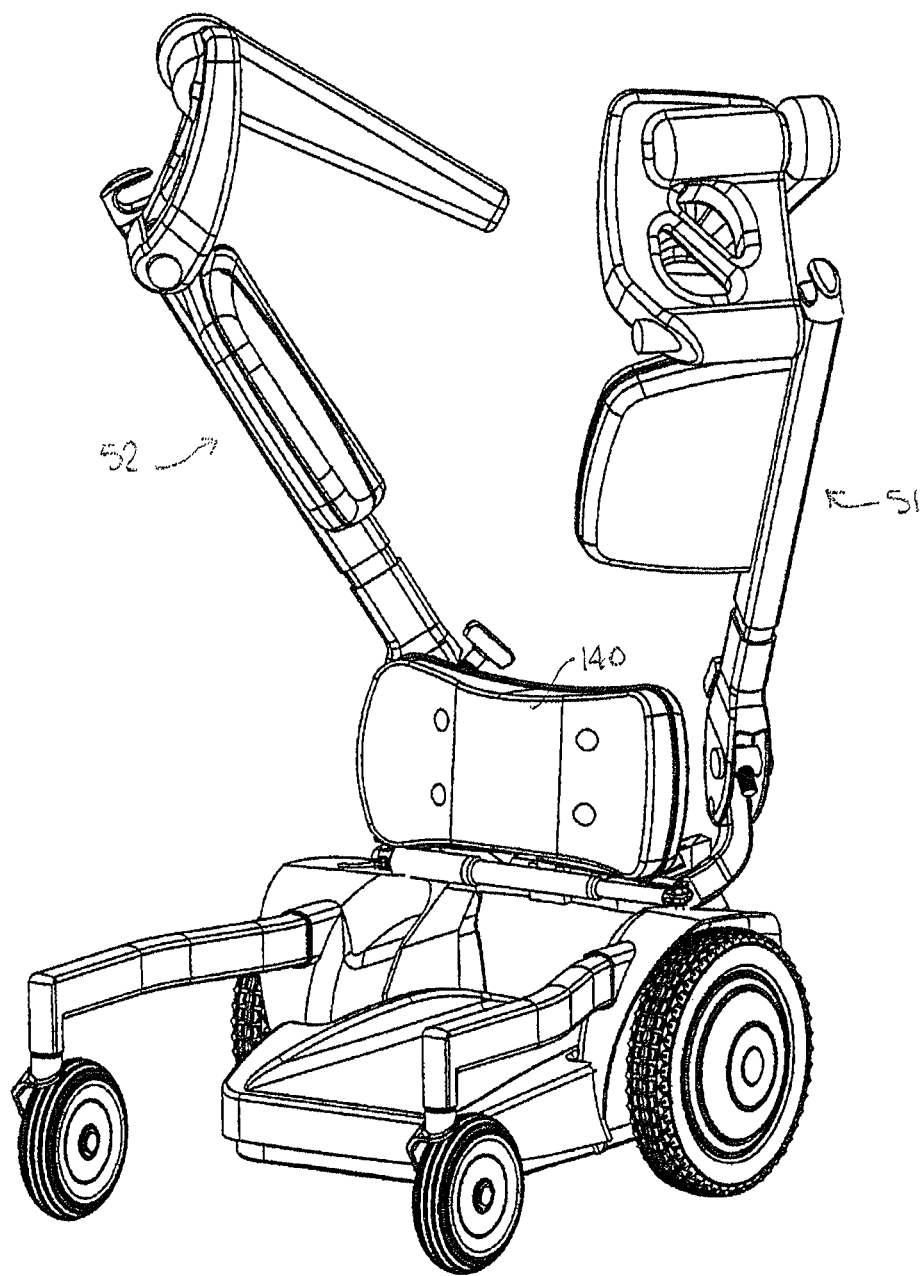
FIG. 7 is a rear perspective view of the mobility device shown in FIG. 1, in an opened configuration.
Figure 8:
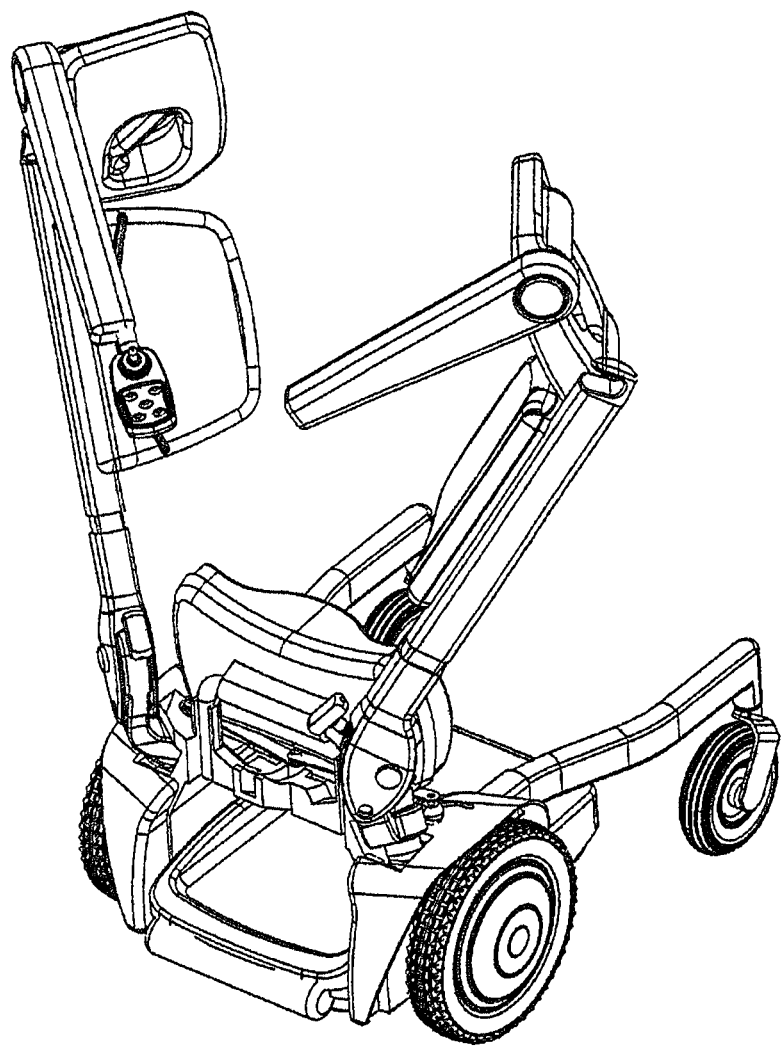
FIG. 8 is a front perspective view of the mobility device shown in FIG. 1, in a raised configuration.

The position of the seat structure 130 is adjustable to accommodate more occupants of varying sizes with a minimum of adjustments. The arrow 30 in FIG. 3a illustrates the direction of along which the seat structure can be adjusted. The seat structure 130 can be moved forward and backward by lengthening or shortening the seat support members. As it can be seen in more details in FIGS. 3b and 3c, the left seat support member 122 is extendable, indeed it slides on sliding member 123. The left seat support member 122 can be locked in this position by using devices known in the art such as, for example, a locking pin. The seat structure 130 adjustment primary function is to fit the back rest structure 150 to the occupants' stature. When the seat structure 130 is correctly positioned, the body of the occupant is fitted or positioned between the shin rest structure 140 and the back rest structure 150 creating a firm fitted feeling for the occupant. The firm fit adds to the perception of control much like a custom fitted car seat. Accessory cushions can be added to limit the lateral movement and to improve comfort of the occupant.

The pivoting mechanism 180 is shown in more details in FIGS. 3b, 3c, 5b and 5c. The pivoting mechanism 180 is located at or near the lower portion of the left seat support member 122 and the right seat support member 124. The pivoting mechanism 180 allows the left seat support member 122 and the right seat support member 124 to pivot outwardly and upwardly to provide a rear access to the mobility device. The left seat support member 122 and the right seat support member 124 can thus move vertically and laterally (outwardly or inwardly). This movement is motorized in the present embodiment (see 123, FIG. 2 showing a motorized raising device). The pivoting mechanism comprises an actuator 80 that is connected to the first pivot member 81 and to the second pivot member 82. To open the side support structure outwardly, the actuator 80 is activated, causing the first pivot member 81 and 82 to pivot along the pivoting axis 86. The pivoting mechanism is preferably located in front of the legs of the occupant. This rotation is effected to provide a rear access or exit from the mobility device. It can be seen that the plane 85 along which the first pivot member 81 and second pivot member 82 are pivoting is leaning toward the inside of the mobility device 100. The pivoting axis 86 is leaning outwardly and rearwardly from said mobility device. This configuration allows the side support structure to pivot outwardly and upwardly at the same time, or otherwise said, along an inclined plane.

The height of the seat structure 130 is adjusted by pivoting the seat supports member 122 and 124 in a substantially vertical plan, or along arrow 181, they are thus more or less inclined. This adjustment is made by screwing or unscrewing the adjusting pin 185 that is located at the lower portion of the left and right side support member 122 and 124, causing the left and right seat support member 122 and 124 to be more or less inclined.

Figure 9:
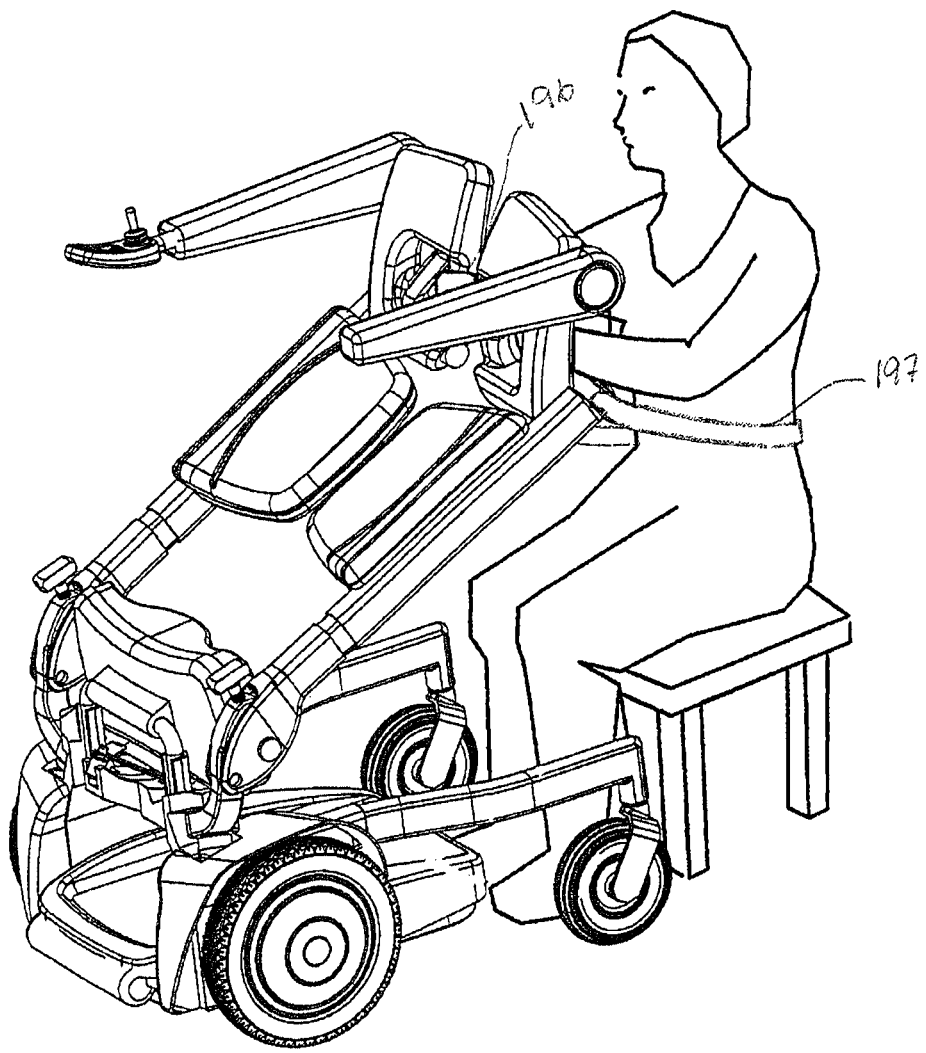
FIG. 9 shows an occupant using the mobility device to get up.
Figure 10A:
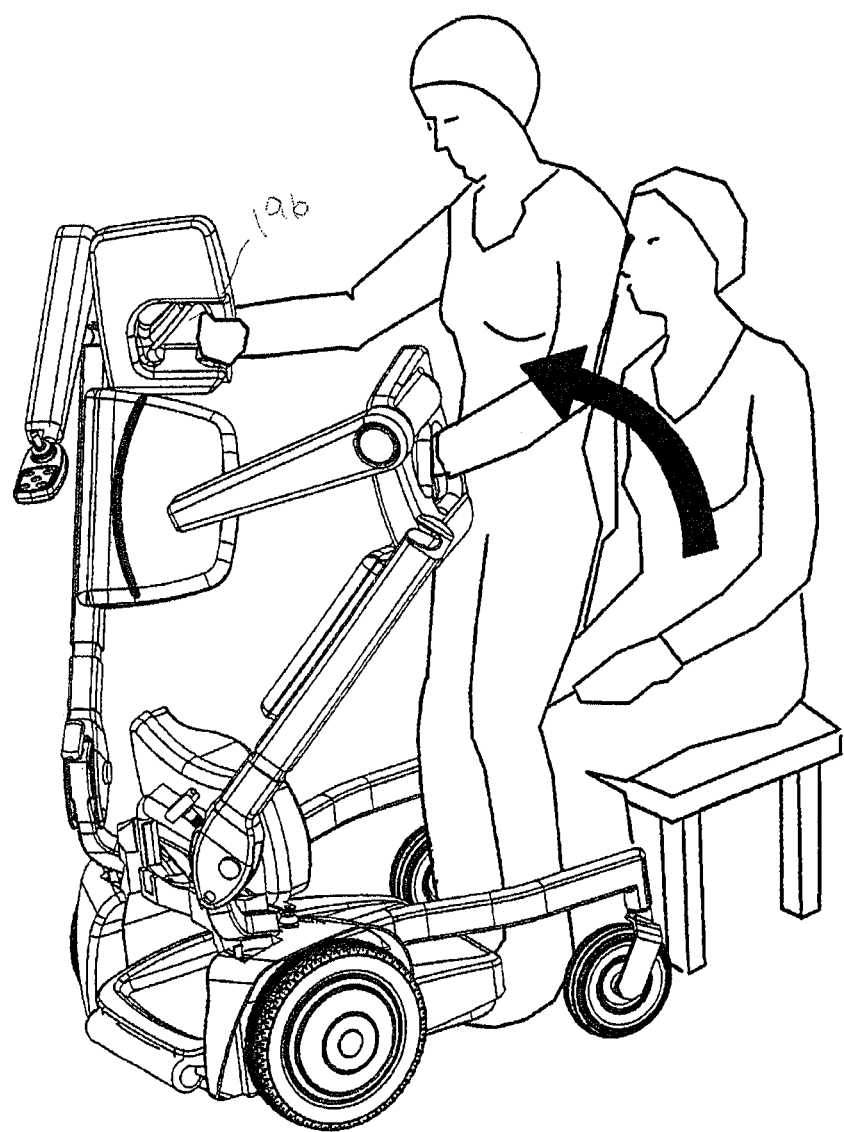
FIG. 10a shows an occupant using the mobility device to get up.

In a preferred embodiment, the mobility device may be used as a raising aid, i.e. the mobility device is used to pull the occupant upwardly, as illustrated in FIGS. 9 and 10a. The mobility device 100 comprises hooks 195 to receive the extremities of a belt 197, and handles 196. In use, the occupant places the belt 197 around his waist and grabs the handles 196. The side support structures are then moved upwardly and help the occupant to get up. The belt 197 is not mandatory, is it more particularly helpful for occupant lacking physical strength. It is to be noted that the mobility device could further comprises a mechanical actuator, such as a hydraulic cylinder, to raise the side support structure vertically for the purpose of getting up an occupant not shown).

In a preferred embodiment, the mobility device may further comprise a raising actuator that pivot the side support structure upwardly to help an occupant to get up.

Shin Rest Structure

The mobility device 100 is also equipped with a shin rest structure 140 (the shin rest structure 140 may be formed by a single element or by a left and right side element) to prevent the occupant from slipping off the seat structure 130. The combination of the seat structure 130 and of the shin rest structure 140 makes it easier to maintain the natural curvature of the lower lumbar region of the back. The angle between the shin rest structure 140 and the seat structure 130 can vary depending on the occupant's preferences, giving the occupant better dynamic position. A more upright position maintains a sense of dignity due to being physically taller when seated. Higher seating position enabling the occupant to talk with standing people at almost the same eye level. Furthermore, the higher or semi-seated position gives the occupant a better reach, requiring less effort to stand and access higher objects than current model of wheelchairs.

Back Rest Structure

The back rest structure 150 comprises a left back rest 152 and a right back rest 154 to support the lower back of the occupant. It is to be noted that the back rest structure 150 could be formed by a single element connected to either one of the side support structure. The back rest structure 150 is connected at, or near, the upper portion to the left side support structure 51 and/or the right side support structure 52.

Arm Rest Structure

The mobility device 100 comprises an arm rest structure 160 comprising a left arm rest 162 and a right arm rest 164 that extend toward the front of the mobility device 100. The arm rest structure 160 is connected at, or near, the upper portion to the left side support structure 51 and/or the right side support structure 52. The position of the arm rests 162 and 164 is adjustable in angle and in height so that their position can be optimized for the occupant, to reduce the weight of the upper body on the lower back. Attached to arm rests 162 or 164 is a control device in form of a joystick 182, for example, as already known in the art. The direction of the mobility device 100 is controlled with the control lever or joystick 182 that is electrically linked to the drive motors integrated in the hub motors or base motors, as known in the art.

Figure 10B:
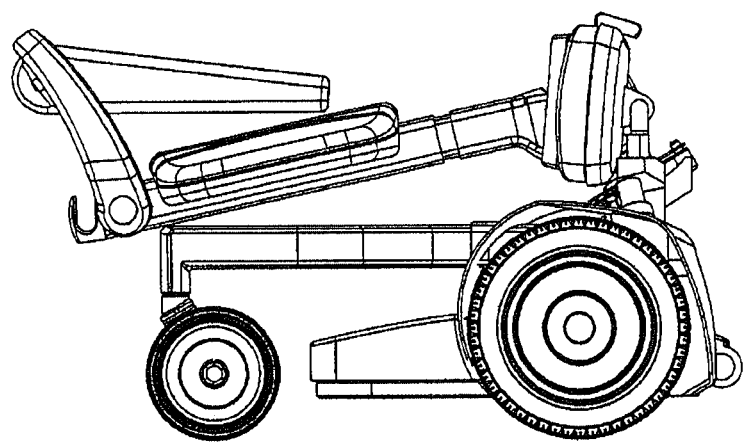
FIG. 10b shows the mobility device of FIG. 1 in a lowered configuration.

The upper part of the mobility device 100 can be lowered to be fitted into a small car, storage space, or optimized for shipping, as shown in FIG. 10b.

It is to be understood that the seat structure, the shin rest structure and the back rest structure described in the present invention does not need to be composed by two symmetrical elements. The seat structure may be composed by two portions that are symmetrical or not, or by a single portion connected to only one side of the mobility device.

FIGS. 11 to 24 show another embodiment of the mobility device. The mobility device 200 generally comprises a wheeled base 210, a seat structure 230, a shin rest structure 240, a back rest structure 250 and an arm rest structure 260.

Wheeled Base

Figure 11:
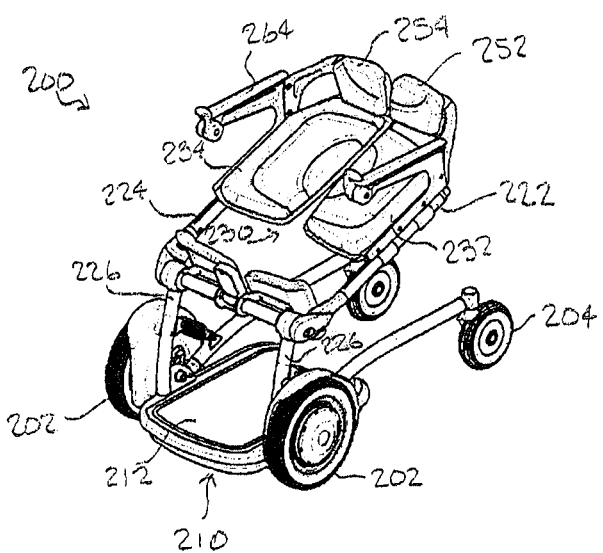
FIG. 11 is a front perspective view of a second embodiment of a mobility device according to the present invention.
Figure 12:
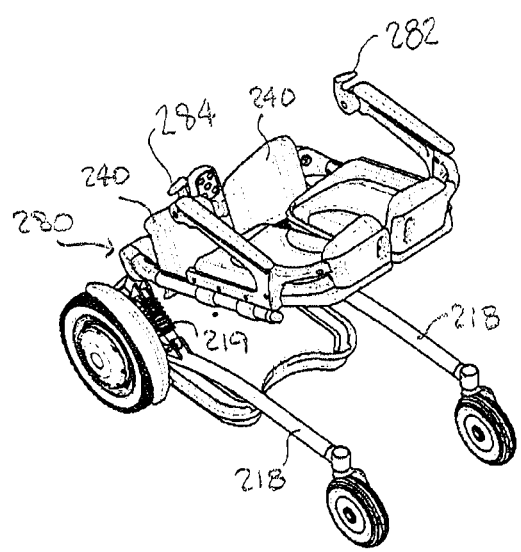
FIG. 12 is a rear perspective view of the mobility device shown in FIG. 11.

As illustrated in FIGS. 11 and 12, the mobility device comprises the wheeled base 210 within which the power supply, primary electronics and motors are preferably mounted. On both sides of the wheeled base 210 are the drive wheels 202 and rear wheels 204. The drive wheels 202 may have integrated motors to propel the unit or can be driven by the motors integrated in the wheeled base 210. Rear wheels 204 are connected at the rear portion of the wheeled base 210 on the base members 218. The wheeled base 210 comprises a base platform 212 on which an occupant step up prior to seat in the mobility device 200.

Front support members 226 extend substantially vertically from the wheeled base 210. The base members 218 are pivotally connected to the wheeled base 210. A shock absorber 219 extends between the base members 218 and the front support members 226, creating an independent left and right suspension, to limit the transmission of shocks to the occupant.

Seat Structure

The seat structure 230 comprises a left side seat portion 232 and a right side seat portion 234. The seat structures 232 and 234 are respectively connected to the left seat support member 222 and the right seat support member 224 that are leaning downwardly toward the front of the mobility device 200.

Figure 14:
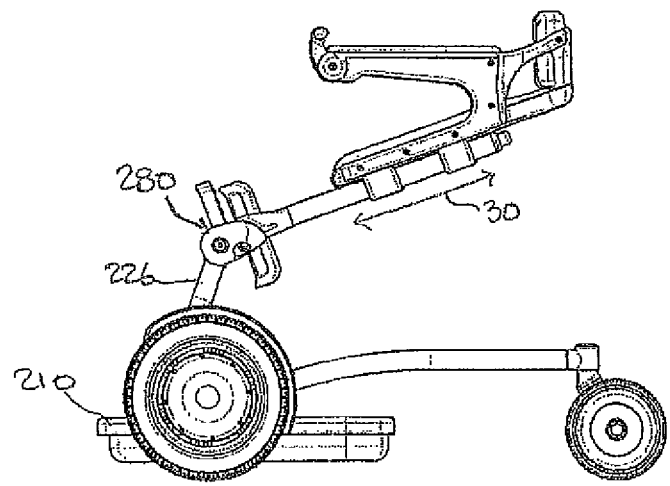
FIG. 14 is a side view of the of the mobility device shown in FIG. 11.

The position of the seat structure 230 is adjustable (its height and its position along the seat support member) to accommodate more occupants of varying sizes with limited adjustments. The arrow 30 of FIG. 14 illustrates the direction along which the seat structure can be adjusted. The seat structure 230 can be moved or slid forward and backward along the left seat support member 222 and the right seat support member 224. The seat structure 230 adjustment allow fitting the back rest to the occupants' stature. When the seat structure 230 is correctly positioned, the body of the occupant is fitted between the shin rest structure 240 and the back rest structure 250 creating a firm fitted feeling for the occupant. Accessory cushions and can be added to limit the lateral movement and to improve comfort. The seat structures 232 and 234 are connected to the seat support members with fitting 238 that contour the diameter of the seat support members 222 and 224. When the fittings 238 are loose, the seats move freely along the seat support members 222 and 224. A key (not visible) sliding in the key way 228 prevents the seat structures 232 and 234 to rotate around the seat support members 222 and 224.

Figure 18:
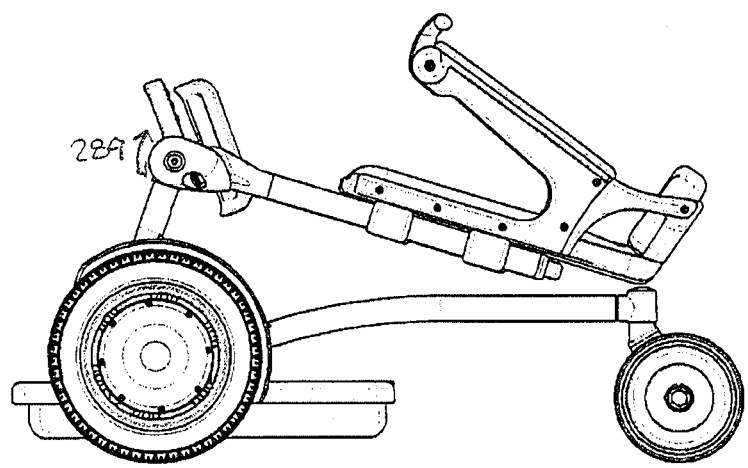
FIG. 18 shows the mobility device shown in FIG. 11 in a lowered configuration.

The height of the seat structure 230 is adjusted by pivoting the left seat support 222 along the arrow 289. This is achieved by using a steering rack, a clutch or a friction device, for example, as already known in the art. In a preferred embodiment, this movement may be motorized and may be actuated by a mechanical actuator that pushes up the left and right seat support members. In the present embodiment, the rotating member 293 is connected to a sprocket wheel (not shown) that is located inside the pivoting mechanism, by screwing or unscrewing this rotating member 293, the left and right support members are pivoted vertically. The first pivot member 291 can rotate along an axis substantially horizontal 295 to adjust the height of the seat. The height of the seat can be adjusted by the occupant to provide an ergonomic position or to adjust the height for a particular activity. The seat can be lowered so it can be compacted fit into a small car, storage space, or optimized for shipping, as shown in FIG. 18.

Figure 13:
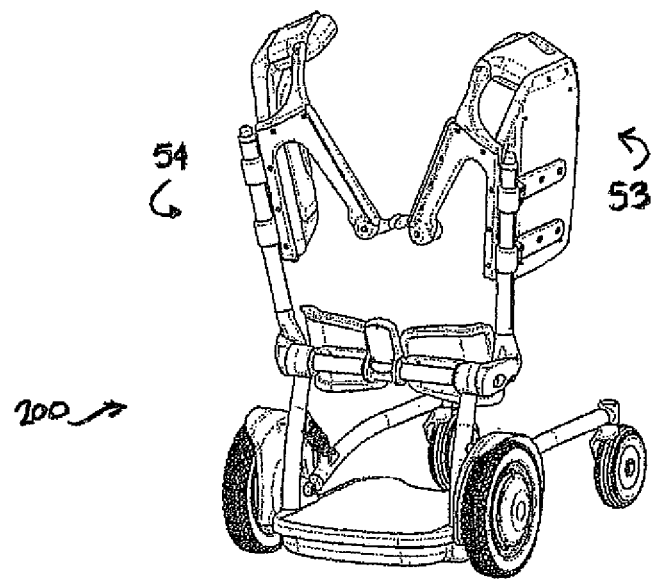
FIG. 13 is a perspective view showing the mobility device shown in FIG. 11, in a raised configuration.
Figure 15:
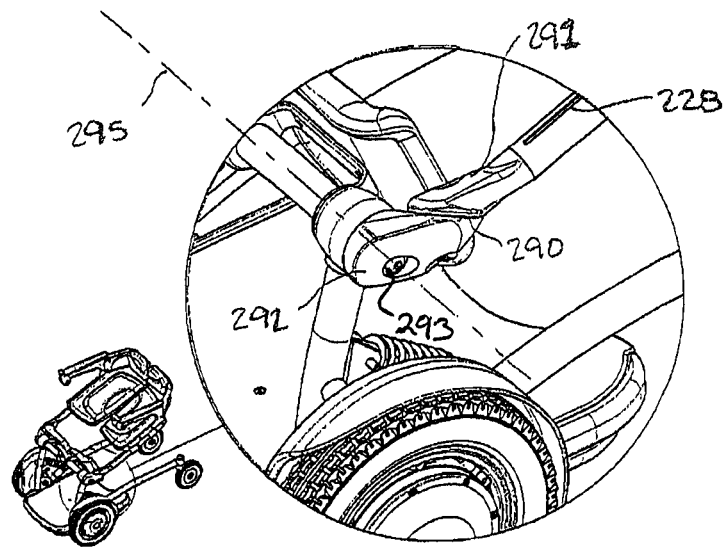
FIG. 15 is a close-up view of the pivoting mechanism of the mobility device shown in FIG. 11.
Figure 16:
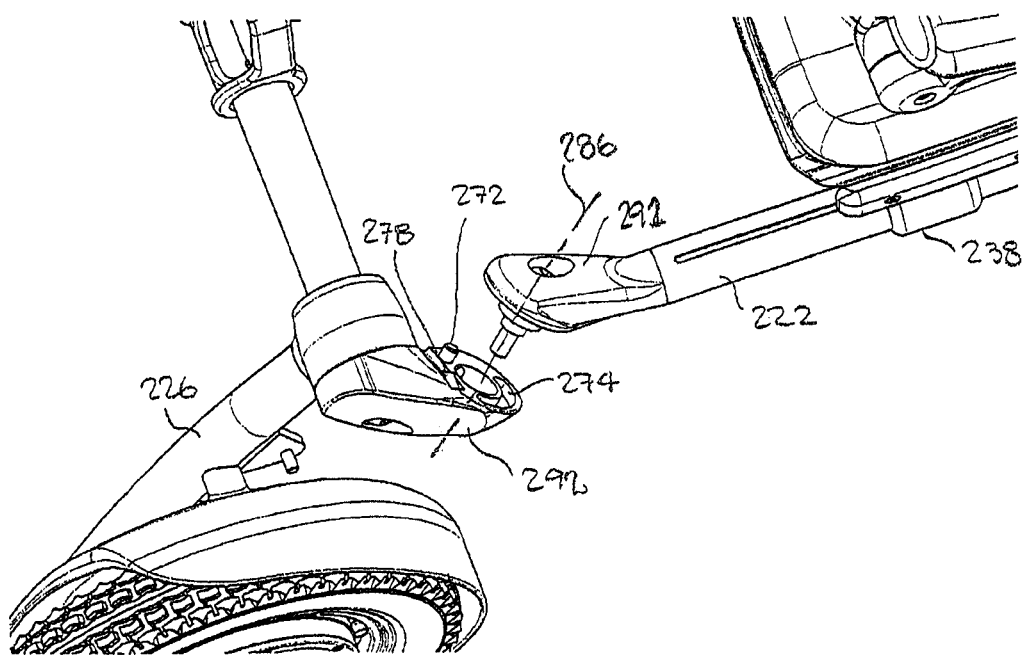
FIG. 16 is another close-up view of the pivoting mechanism of the mobility device shown in FIG. 11.
Figure 17:
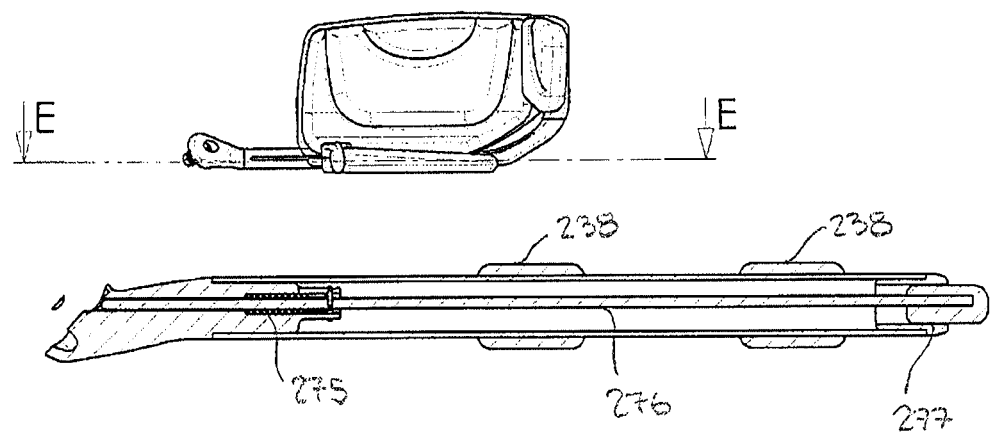
FIG. 17 shows the releasing mechanism of the mobility device shown in FIG. 11.

The pivoting mechanism 280 allowing the mobility device 200 to be opened (meaning that the left side support structure 53 and the right side support structure 54 are rotated outwardly and upwardly to provide a rear access to the mobility device 200) is shown in FIGS. 15 and 16. Since the mobility device 200 is symmetrical, the following description is made only for the left side of the mobility device 200. The pivot mechanism 280 comprises a first pivot member 291 and a second pivot member 292. The second pivot member 292 is connected at an extremity of the left seat support member 222. The first pivot member 291 is connected to the front support member 226. The plane 290 between the first pivot member 291 and the second pivot member 292 is angled so that the seat structure 230 can be moved out from underneath of the occupant and pivoted to a semi vertical position allowing access to the mobility device 200 from the rear as shown in FIG. 13. It can be seen in the figures that the plane 290 between the first pivot member 291 and the second pivot member 292 is angled relatively to a horizontal surface or a vertical surface. This angled plane 290 allow the left and right seat support members 222 and 224 to open upwardly and toward the external sides of the mobility device 200 and to give space to a occupant to go between the upward seats. The first pivot member 292 pivot along the pivoting axis 286 that is leaning outwardly and rearwardly from said mobility device. This pivot mechanism 280 is configured so that minimum space is needed to open both seat structure 232 and 234. This gives the occupant the advantage that the mobility device 200 can be opened and used in areas where space is limited. The same pivot mechanism 280 is used on the left side and on the right side of the mobility device.

The angle of the pivot mechanism 280 also limits the tendency for the seat to open unintentionally. However, a double fault mechanism or blocking mechanism will lock the seat structure 230 in the closed position if weight is applied to the seat. The blocking mechanism comprises a first pin 271 and a second pin (not visible). The first pin 271 extends from the first pivot member 291 and the second pin extends from the second pivot member 292. Once the seats are in a substantially vertical position, a latch or locking tab 278 latches the first pivot member 291 and the second pivot member 292 so that the seat can be used to assist the occupant, as a handle (as shown in FIG. 21 to 24), to gain access to the mobility device. This locking tab 278 can be disengaged by means of a release mechanism, shown in FIG. 17, enabling the occupant to release the locking tab 278 and rotate the seat to the seating position.

The first pin 271 and the second pin slide in a first semi circular groove (not visible) and in a second semi circular groove 274, respectively. The length of the semi circular grooves is adapted so that the pins abut against the groove's end at the desired limit of rotation. Once the pin and groove are at their final limited position, a supplementary blocking device limits the return of pivoting component. This device consists of a first spring mechanism 275 that can be remotely released via a releasing member 276 which places the release button 277 in an ergonomic accessible position.

Shin Rest Structure

The mobility device 200 is also equipped with a shin rest structure 240 (the shin rest structure 240 may be formed by a single element or by a left and right side element) to stop the occupant from slipping off the seat structure 230. The combination of the leaning seat structure 230 and of the shin rest structure 240 makes it easier to maintain the natural curvature of the lower lumbar region of the back. The angle between the shin rest structure 240 and the seat structure 230 can vary depending on the occupant's preferences, giving the occupant better dynamic position.

Back Rest Structure

The back rest structure 250 comprises a left back rest 252 and a right back rest 254 to support the lower back of the occupant.

Arm Rest Structure

The mobility device 200 comprises an arm rest structure 260 comprising a left arm rest 262 and a right arm rest 264. The position of the arm rests 262 and 264 is adjustable in angle and in height so that they can be optimized for the occupant, to reduce the weight of the upper body on the lower back. Attached to arm rests 262 and 264 are the control levers 282 and 284.

Figure 21:
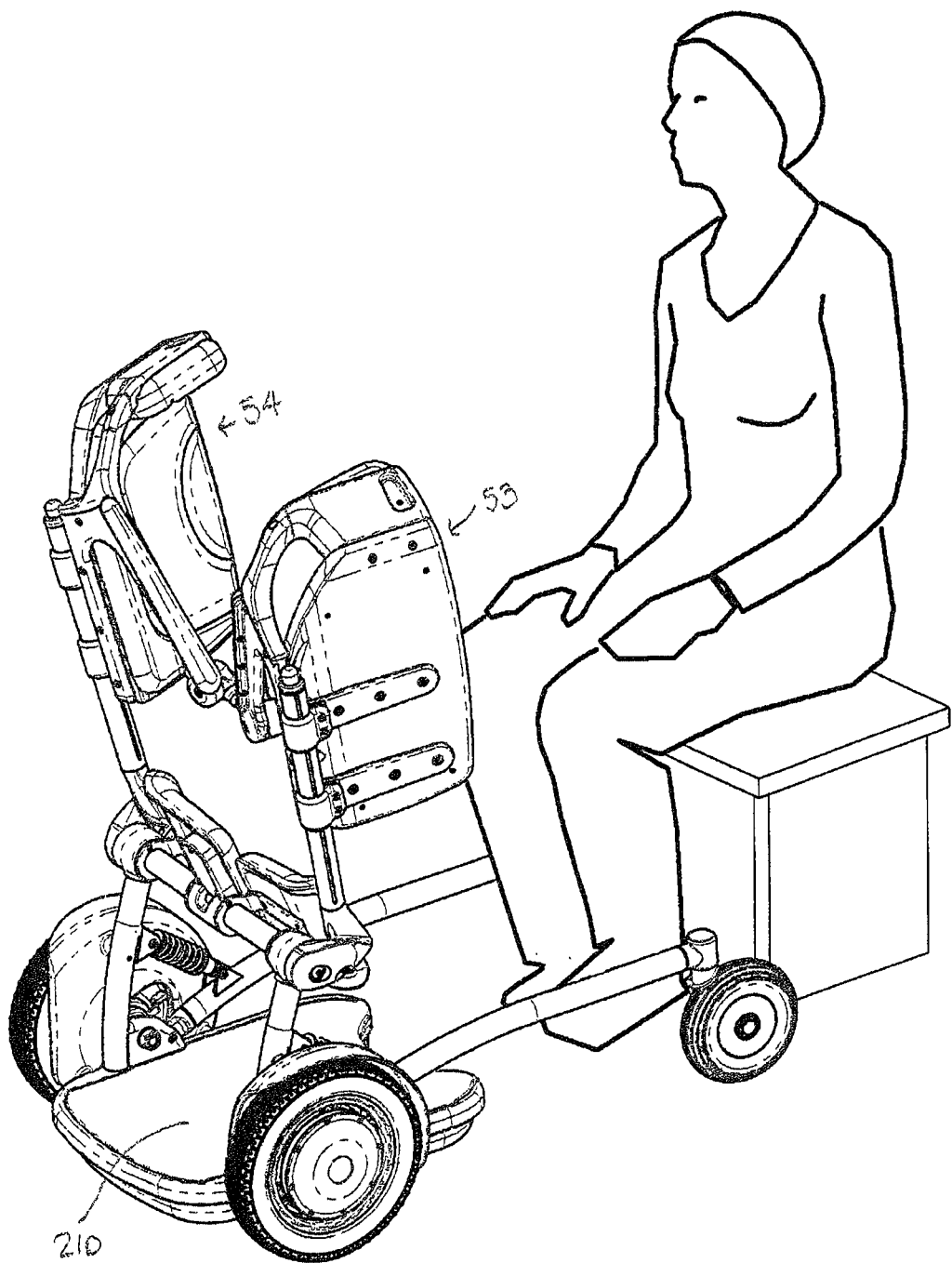
FIG. 21 illustrates how an occupant proceeds to seat in the mobility device shown in FIG. 11.
Figure 22:
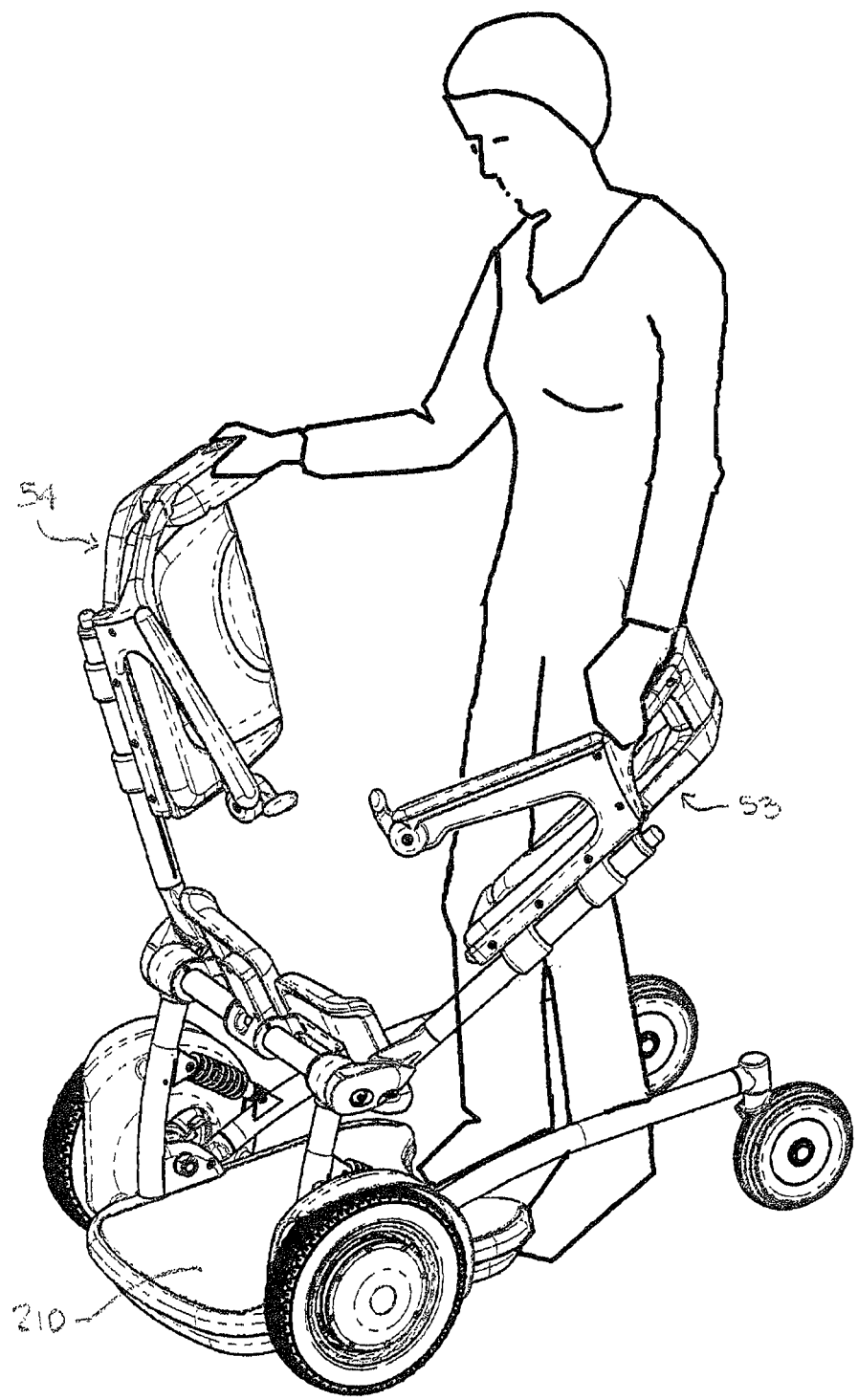
FIG. 22 illustrates how an occupant proceeds to seat in the mobility device shown in FIG. 11.
Figure 23:
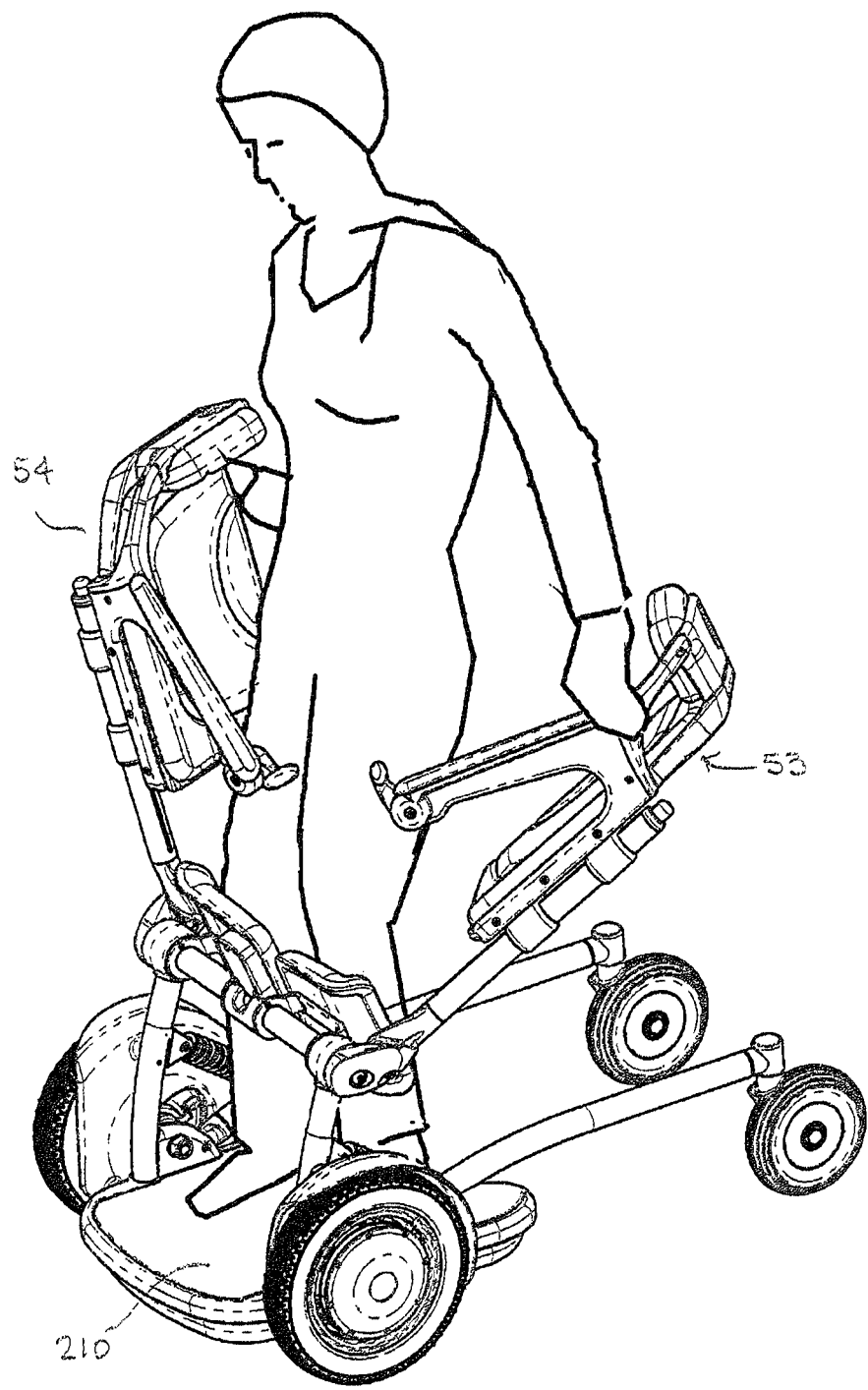
FIG. 23 illustrates how an occupant proceeds to seat in the mobility device shown in FIG. 11.
Figure 24:
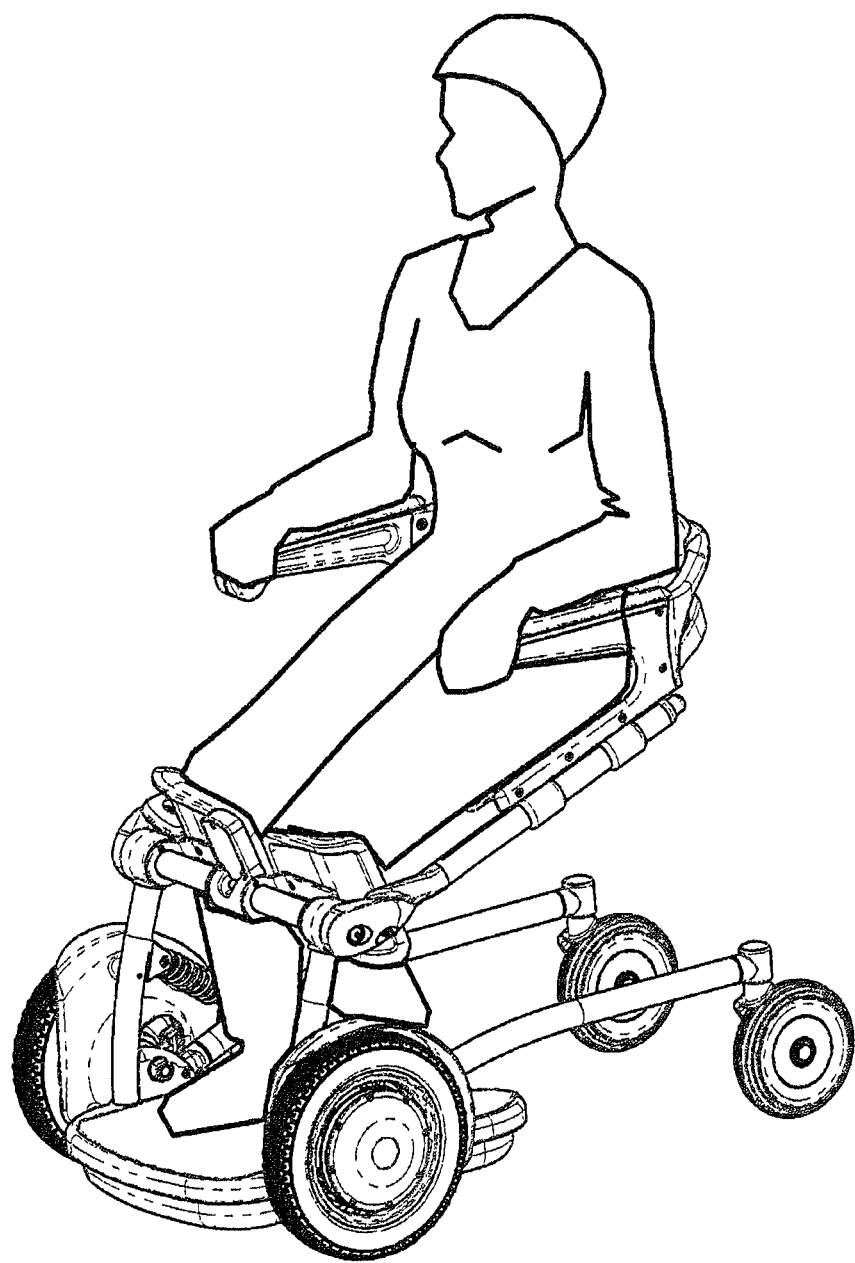
FIG. 24 illustrates how an occupant proceeds to seat in the mobility device shown in FIG. 11.

FIGS. 21 to 24 illustrate how an occupant seat in the mobility device. The first step consists of positioning the mobility device in front of the occupant, the rear of the mobility device facing the occupant. The left and right side support structures 53 and 54 are opened outwardly, as shown in FIG. 21. Then, as illustrated in FIGS. 22 and 23, the occupant gets up and steps up on the wheeled base 210. The occupant then closes the left and right side support structures 53 and 54 and seats on the seat structure, as shown in FIG. 24.

Figure 19:
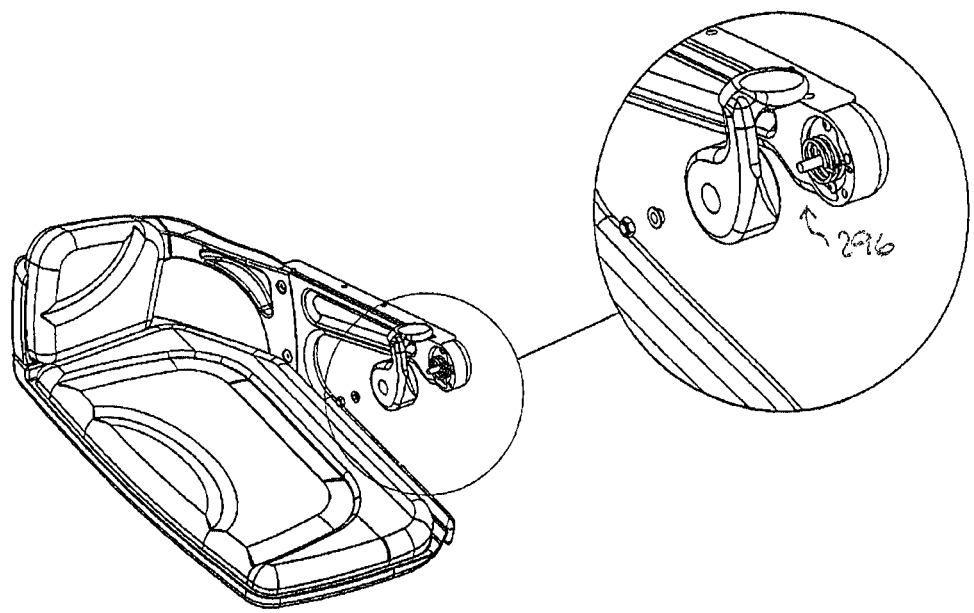
FIG. 19 is a close-up view of a control lever of the mobility device shown in FIG. 11.
Figure 20:
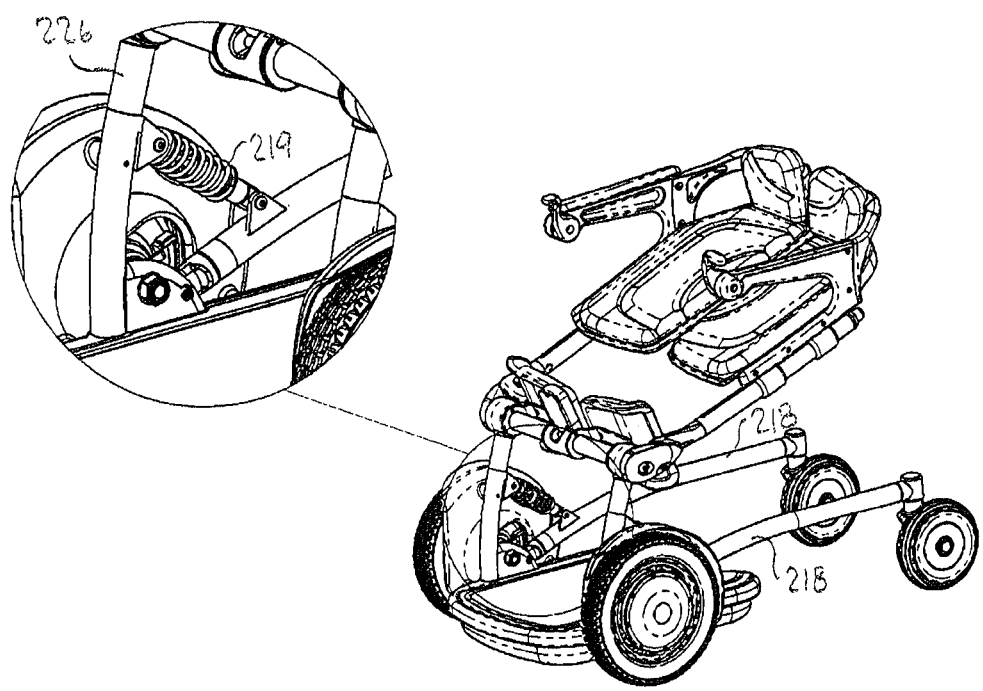
FIG. 20 is a close-up view of the suspension mechanism of the mobility device shown in FIG. 11.

The direction of the mobility device 200 is controlled by rotation of the control levers 282, 284 that are electrically linked to the drive motors integrated in the hub motors or base motors, as already known in the art. Each control lever 282 and 284 activates the right or the left drive motor independently. The general driving technique consists of moving the control levers 282, 284 forward and backwards. As the control levers 282, 284 are moved forward, the mobility device 200 will begin to move. If the forward movement of the control levers 282, 284 is increased, the mobility device 200 will accelerate. If the movement of the control levers 282, 284 is asymmetrical, i.e. one of the control levers 282, 284 moves further and/or faster than the other, the mobility device's motors will respond with different rotation speeds and the mobility device 200 will turn toward the slower rotating motor side. Therefore, turning the mobility device 200 is possible by adjusting the rotation speed of the wheels with respect to one and other. Similarly, to move the mobility device 200 backward, both control levers 282, 284 can be used at different activation distances to reverse or reverse and turn. To turn on place, the occupant would push one of the control levers 282, 284 forward and the other backward, if the movement of the control levers 282, 284 is equal, the rotation of the mobility device 200 will be on one spot. As the distances and movement differ between the left and the right control levers 282, 284 (one is moved more rapidly that the other) the mobility device 200 will turn with a larger turning radii. If the control levers 282, 284 are moved in opposite directions, the power and speed is reduced to avoid rapid rear swinging of the mobility device 200. Each control lever 282, 284 have a neutral/brake position where by default no movement is possible and with a time delay of the parking brake is applied. This neutral/brake position is maintained by a second spring mechanism 296 that returns the control levers 282, 284 to its neutral position once released. The spring mechanism 296 is shown in FIG. 19. If one of the control levers 282, 284 is activated and the other lever is in the neutral position, both motors will be controlled by the active control lever, thus moving the mobility device 200 in a linear direction. As the second lever is activated, the linear direction will be maintained until the control levers 282, 284 are equal in distance from the neutral point. Once at equal distance, both control levers 282, 284 will control their respective motors independently.

The mobility device 200 comprises accelerometers and electric contacts, located within the arm rest structure 260, the seat structure 230, or the control levers 282, 284. The accelerometers and electric contacts reference the angle and position of the seat and the state of the seat, i.e. open or close. If the seat structure 230 is in an open configuration for access by an occupant, the power of the motors and of the control levers is cut to avoid unintended activation of the mobility device 200 when embarking. This control mechanism will also activate the electric parking brakes of each motor stabilizing the mobility device for occupant to step on or off safely.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A personal mobility device comprising:
   a) a wheeled base comprising a base platform;
   b) side support structure extending above said wheeled base, said side support structure comprising a left side support structure and a right side support structure having a lower extremity, wherein said side support structure has an access configuration and a seat configuration, said side support structure comprising:
      i) seat support members;
      ii) a seat structure connected to said seat support members;
      iii) a back rest structure connected to said seat support members;
      iv) an arm rest structure connected to said seat support members;
   c) a shin rest structure extending above said wheeled base; and
   d) a pivoting mechanism connected at the lower extremity of said left side support structure and at the lower extremity of said right side support structure allowing said left side support structure and said right side support structure to pivot outwardly and upwardly to provide a rear access to said mobility device.

2. The personal mobility device of claim 1, wherein said seat structure position is adjustable along said seat support members.

3. The personal mobility device of claim 1, wherein said seat structure comprises a left seat portion connected to said left side support structure and a right side seat portion connected to said right side support structure.

4. The personal mobility device of claim 1, wherein said pivoting mechanism is motorized.

5. The personal mobility device of claim 1, further comprising motors to propel said mobility device and a control device to control said mobility device.

6. The personal mobility device of claim 1, further comprising a motorized raising device to raise said side support structure in a substantially vertical plan.

7. The personal mobility device of claim 1, further comprising handles configured to serve as a raising aid.

8. The personal mobility device of claim 1, further comprising hooks configured to retain a belt to serve as a raising aid, wherein said belt is passed around the waist of an occupant.

9. The personal mobility device of claim 1, wherein said left side support structure and said right side support structure pivot simultaneously.

10. The personal mobility device of claim 1, further comprising an adjusting pin controlling the height of said seat support members.

11. The personal mobility device of claim 1, wherein said seat support members are extendable.

12. A personal mobility device comprising:
a) a wheeled base comprising a base platform;
b) a left seat support member extending from a first left pivot member and a right seat support member extending from a first right pivot member;
c) a left seat structure connected to said left seat support
d) a left back rest structure connected to said left seat support member and a right back rest structure connected to said right seat support member;
e) a shin rest structure extending above said wheeled base; and
f) a left arm rest structure connected to said left seat support member and a right arm rest structure connected to said right seat support member;
wherein said first pivot members pivot along a pivoting axis leaning outwardly and rearwardly from said mobility device, causing said left seat support member and right seat support member to pivot outwardly to provide a rear access to said mobility device, and wherein said mobility device has an access configuration and a seat configuration.

13. The personal mobility device of claim 12, wherein said left seat support member and right seat support member are extendable.

14. The personal mobility device of claim 12, wherein said seat structure position is adjustable along said seat support members.

15. The personal mobility device of claim 12, wherein said first pivot members are motorized.

16. The personal mobility device of claim 12, further comprising motors to propel said mobility device and a control device to control said mobility device.

17. The personal mobility device of claim 12, further comprising a motorized raising device to raise said side support structure in a substantially vertical plan.

18. A personal mobility device comprising:
a) a wheeled base comprising a base platform;
b) side support structure extending above said wheeled base, said side support structure comprising a left side support structure and a right side support structure having a lower extremity, wherein said side support structure has an access configuration and a seat configuration, said side support structure comprising:
i) seat support members;
ii) a seat structure connected to said seat support members;
iii) a back rest structure connected to said seat support members;
iv) an arm rest structure connected to said seat support members;
c) a shin rest structure extending above said wheeled base;
d) a first lateral pivoting mechanism connected at the lower extremity of said left side support structure and at the lower extremity of said right side support structure allowing said left side support structure and said right side support structure to pivot outwardly; and
e) a second lateral pivoting mechanism connected at the lower extremity of said left side support structure and at the lower extremity of said right side support structure allowing said left side support structure and said right side support structure to pivot upwardly.

19. The personal mobility device of claim 18, wherein said seat structure position is adjustable along said seat support members.

20. The personal mobility device of claim 18, wherein said lateral pivoting mechanisms are motorized.

21. The personal mobility device of claim 18, wherein said seat support members are extendable.

\* \* \* \* \*